United States Patent [19]

Stastny et al.

[11] 4,031,634
[45] June 28, 1977

[54] TEACHING DEVICE

[75] Inventors: Edwin Stastny, Santa Ana; Keith Rauch, Los Angeles; Ronald Young, Simi Valley, all of Calif.

[73] Assignee: Califone International, Inc., Los Angeles, Calif.

[22] Filed: Nov. 24, 1975

[21] Appl. No.: 634,493

[52] U.S. Cl. .................................. 35/8 A; 35/35 C; 360/2; 360/106
[51] Int. Cl.² ...................... G09B 5/04; G11B 5/55; G11B 25/04
[58] Field of Search ............... 35/8 A, 35 C; 360/2, 360/106

[56] References Cited

UNITED STATES PATENTS

| | | | |
|---|---|---|---|
| 3,488,867 | 1/1970 | Lyon et al. | 35/35 C |
| 3,540,133 | 11/1970 | Davidge et al. | 35/9 A |
| 3,705,270 | 12/1972 | Huber | 360/106 X |
| 3,839,735 | 10/1974 | Denk | 360/106 |
| 3,839,737 | 10/1974 | Vogel | 360/106 |
| 3,893,182 | 7/1975 | Schmidt | 35/8 A X |

*Primary Examiner*—William H. Grieb
*Attorney, Agent, or Firm*—Lyon & Lyon

[57] ABSTRACT

A device employing audio and visual aids for the teaching of reading, arithmetic and the like. The device is to be used with cards having printed indicia and a magnetic strip. The device includes a housing having a microphone, a speaker and a chassis positioned therein. A card path extends across the housing and the chassis. Located on the chassis is a magnetic recording and reproducing head assembly capable of recording and reproducing that which has been recorded on two tracks on the magnetic strip. Separate drive systems are employed for forward and reverse and are also mounted on the chassis. A selector plate is pivotally mounted on the chassis and includes certain rollers associated with both the forward and reverse drive systems such that the selector plate may be pivoted to disengage the forward drive system and simultaneously engage the reverse drive system to return a card to its starting position. A system on-off switch extends to the card path so the system will be activated by the placement of a card in the card path. The placement of the head assembly is controlled by a cam such that the head may be moved laterally across the card path for the selection of one of two tracks. A switch alternately provides recording on or reproducing from the magnetic strip. Control of the teaching device is provided by three keys each of which selects a predetermined track, selects either the record or reproduce modes and activates the reverse drive means to return the card to the starting position. The device then automatically drives the card forward across the head assembly to record or reproduce that which has been recorded. A locking mechanism is provided to prevent students from erasing and recording over prerecorded information on one track.

17 Claims, 14 Drawing Figures

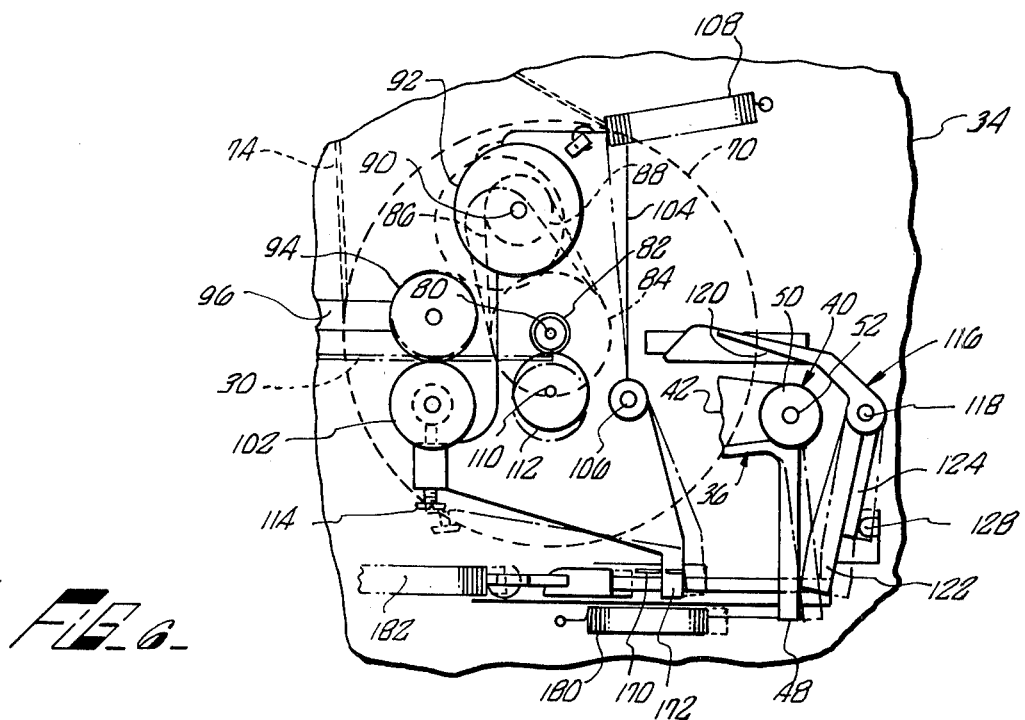
FIG_6
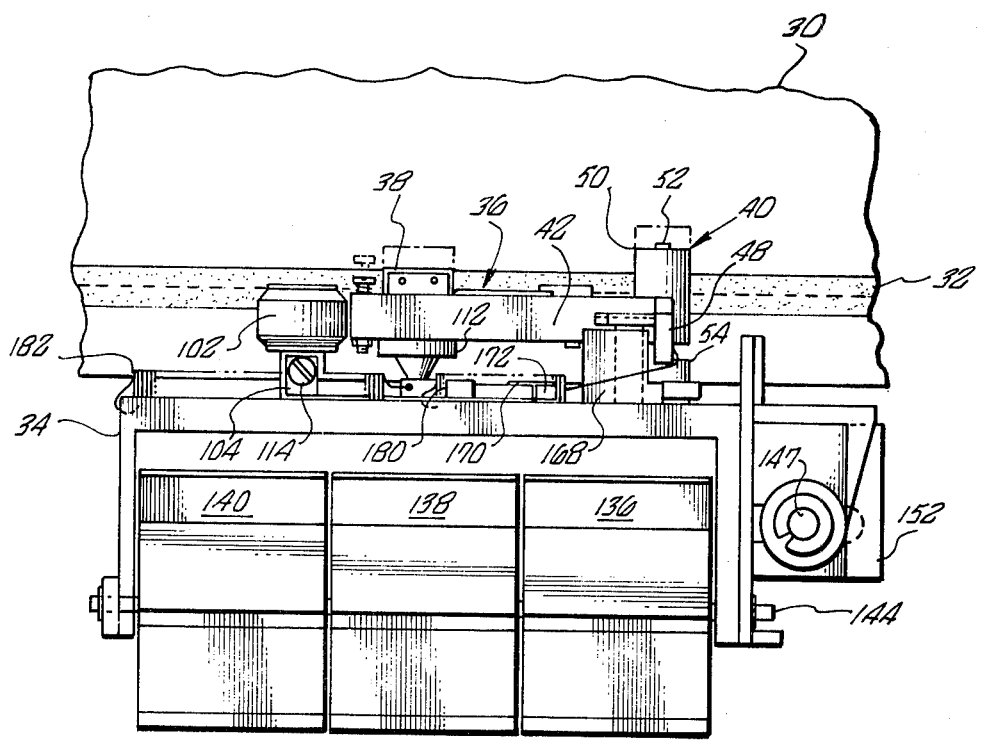
FIG_7

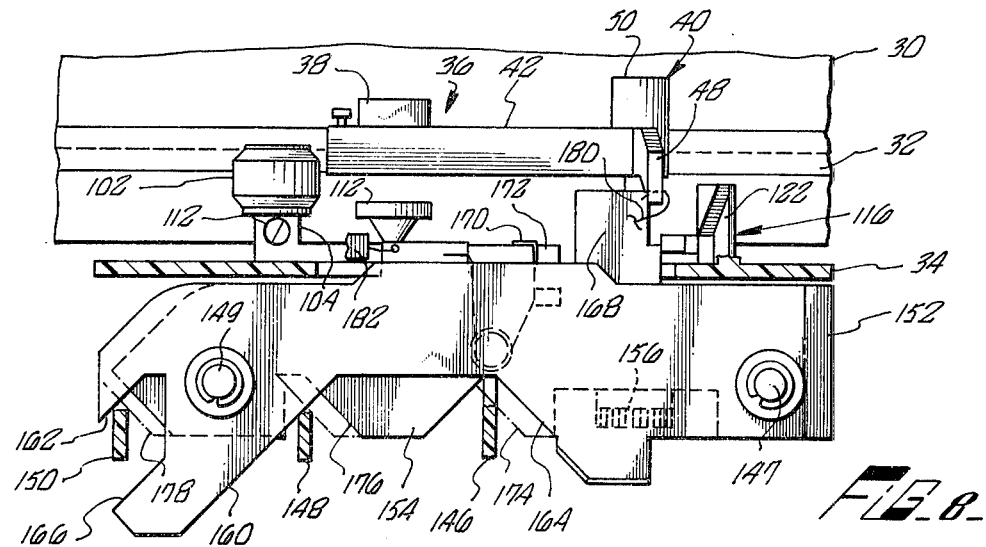

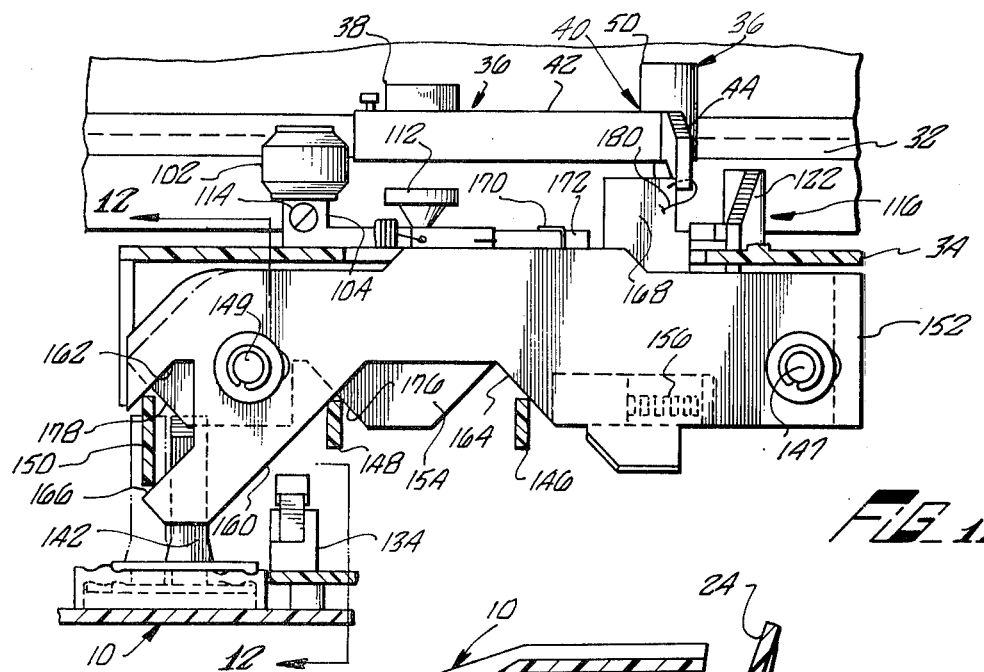
FIG. 11
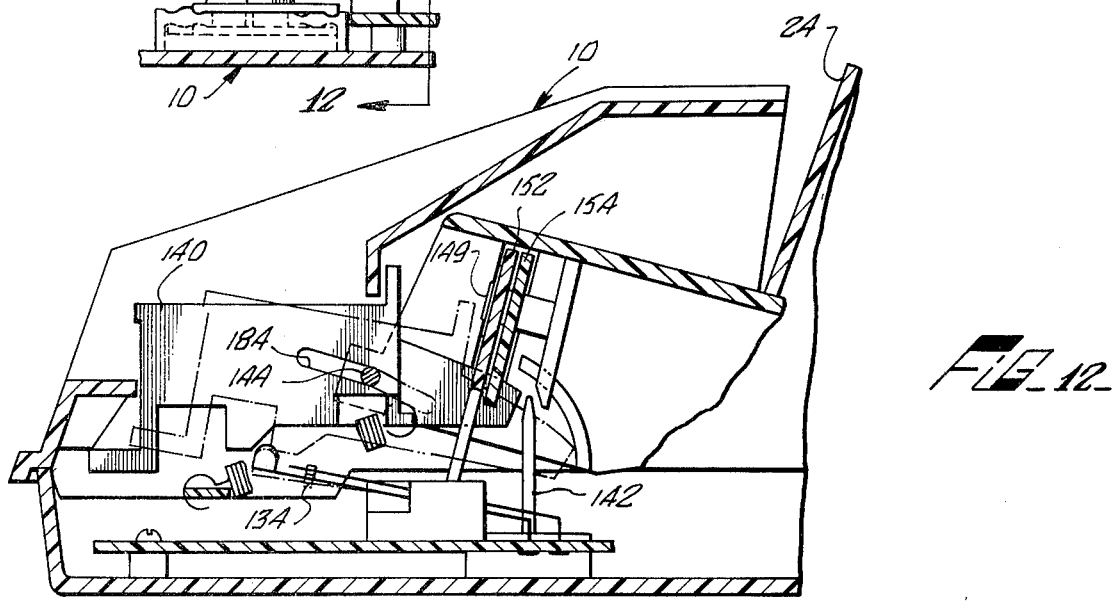
FIG. 12
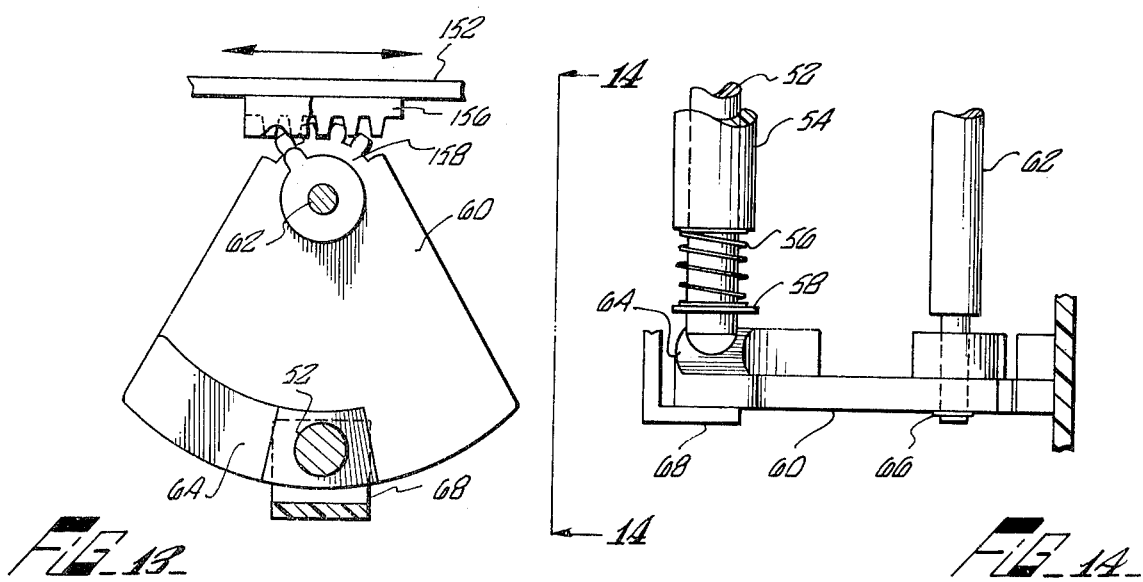
FIG. 13
FIG. 14

TEACHING DEVICE

BACKGROUND OF THE INVENTION

The present invention is directed to a teaching device employing cards having a magnetic strip thereon for magnetic recording and audio reproduction.

Recently several devices have been developed which employ cards having magnetic strips thereon for using both audio and visual means for teaching reading, arithmetic and the like. The cards may be of a wide variety of convenient sizes but typically have dimensions similar to those for standard computer program cards. A large area of the card is provided for printed indicia such as a reading word or simple arithmetic problem. A magnetic strip extends across the card near the bottom thereof to provide the audio portion of the teaching aid. Two tracks are provided on the magnetic strip, a first track for the instructor's oral recitation of the printed indicia and a second track for the student to record what has been previously written and recorded on the card and then play back his recitation.

A major difficulty with such systems is the complexity required for the several operation modes contemplated for such a device. Frequenty, the mastering of the controls by the student requires substantial time and thereby detracts from the time spent learning the material on the cards. Furthermore, the number of controls adds to the overall complexity of the mechanism which can result in operator abuse and frequent breakdown. As a result of these problems, such systems are often inefficient as an instructional tool with younger students.

SUMMARY OF THE INVENTION

The present invention is directed to a teaching device employing such cards as described above. The present invention has made possible substantial reductions in the complexity of control of such teaching aids by associating the several control requirements with three keys. Each key completely determines a given mode of operation and positions the card for immediate use in that operational mode. The student is required only to manipulate the three keys and replace cards when necessary. A system on-off switch is activated by the initial placement of a card in the card path. The card is automatically driven forward across a magnetic head in any one of the three preselected modes. Once the card has passed across the recording and reproducing head assembly, the student may select a first key which returns the card to the start position and actuates the device such that when the key is released, the card will automatically play the instructor's message on the first track. If a second key is pushed, the card is again returned to the starting position and the device is actuated to play the students recitations on the second track when the key is released. The third key again returns the card to the starting position and actuates the device to provide for recording, on the second track, the student's oral recitation. The last key further may be actuated by the instructor in the opposite direction to record on the first track reserved for the instructor's recitation.

To accommodate the above advantageous operating features, separate forward and reverse drive mechanisms are employed. These mechanisms can be actuated together to provide forward and reverse motion of the card. A cam operably associated with the keys selects the position of the head assembly to record and reproduce on either track.

Thus, it is the primary object of the present invention to provide a teaching device using cards as above described which is easily operated.

It is another object of the present invention to provide an improved control mechanism for operating a magnetic card teaching apparatus.

It is a further object of the present invention to provide an improved control mechanism for shifting a magnetic recording and reproducing head assembly for selectively aligning with magnetic tracks.

It is yet a further object of the present invention to provide a forward and reverse drive system for a magnetic card teaching device.

Other and further objects and advantages will appear hereinafter.

BRIEF DESCRIPTION OF THE DRAWINGS

FIG. 6 is a top view in detail illustrating the drive mechanism.

FIG. 7 is a detailed front elevation illustrating the head assembly and drive mechanism of the teaching device.

FIG. 8 is a sectional elevation of the control mechanism of the teaching device in a first operative mode.

FIG. 9 is a sectional elevation of the control mechanism of the teaching device in a second operative mode.

FIG. 10 is a sectional elevation of the control mechanism of the teaching device in a third operative mode.

FIG. 11 is a sectional elevation of the control mechanism of the teaching device in a fourth operative mode.

FIG. 12 is a sectional side elevation in detail showing the record key.

FIG. 13 is a detailed plan view of the track selecting cam.

FIG. 14 is a detailed side view of the track selecting cam.

DETAILED DESCRIPTION OF THE PREFERRED EMBODIMENT

Figure 1:
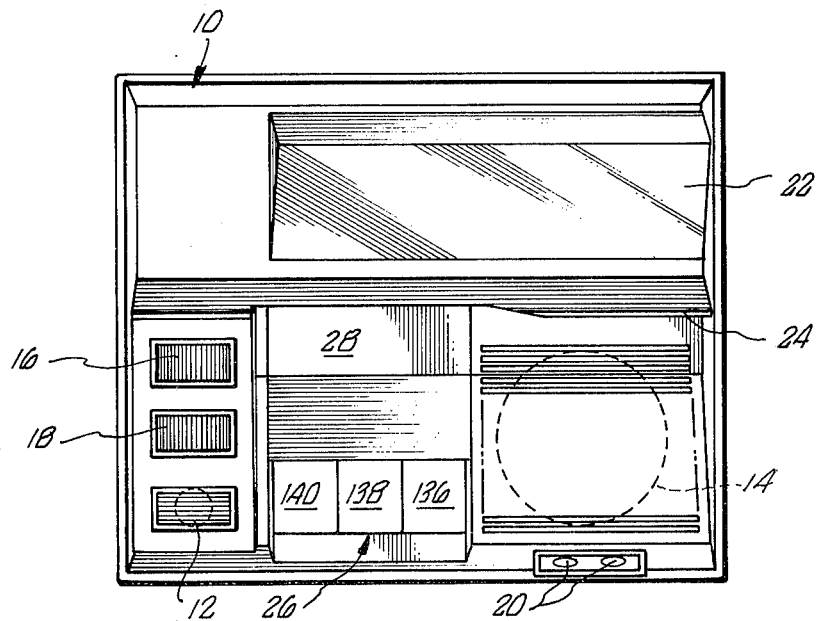
FIG. 1 is a plan view of the assembled teaching device.
Figure 2:
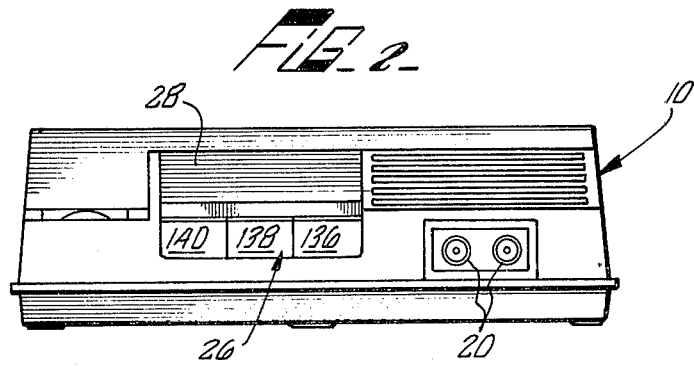
FIG. 2 is a front elevation of the assembled teaching device.
Figure 3:
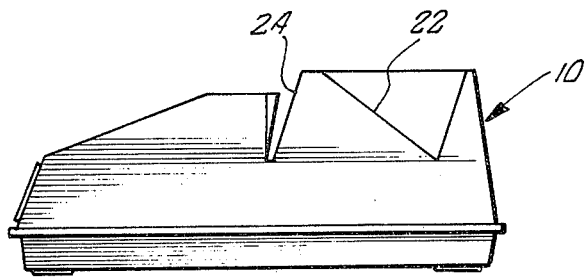
FIG. 3 is an end elevation of the assembled teaching device.

Turning in detail to the drawings, FIG. 1 illustrates the overall housing, generally designated 10. The housing 10 is generally designed to cover the working mechanism and further provides for a microphone 12, a speaker 14, a volume control 16, a speed control 18 and two auxiliary jacks 20. A compartment 22 provides storage capacity for teaching cards.

A card path 24 traverses the housing. Cards are positioned on the teaching device on the card path 24 at a starting location on the far right end of the card path 24. Once used, cards may be removed from the card path 24 at the far left of the housing 10. A keyboard, generally designated 26, is conveniently located at the front of the unit. A cover 28 is removable for access to certain portions of the control, recording and reproducing mechanisms.

A portion of a card contemplated for use for the present invention is illustrated in FIG. 7. The card 30 may be of any convenient size; however, it has been found that cards roughly 8.9 cm. (3.5 inches) high and 23 cm. (9 inches) long are generally adequate for the purposes intended and are easily handled. The present mechanism will take cards of any length and heighth. Located near the bottom edge of the card 30 is a magnetic strip 32 of conventional magnetic recording material. The strip is of sufficient width to accommodate two recording tracks. The major portion of the card then remains for printed indicia of reading words, simple arithmetic problems and the like.

The housing 10 supports a chassis 34 which in turn supports the various control mechanisms, drive mechanisms and recording and reproduction mechanisms. The card path 24 extends across the chassis 34. Cards can be seen in phantom in FIGS. 4 and 6 extending across the chassis 34.

Figure 4:
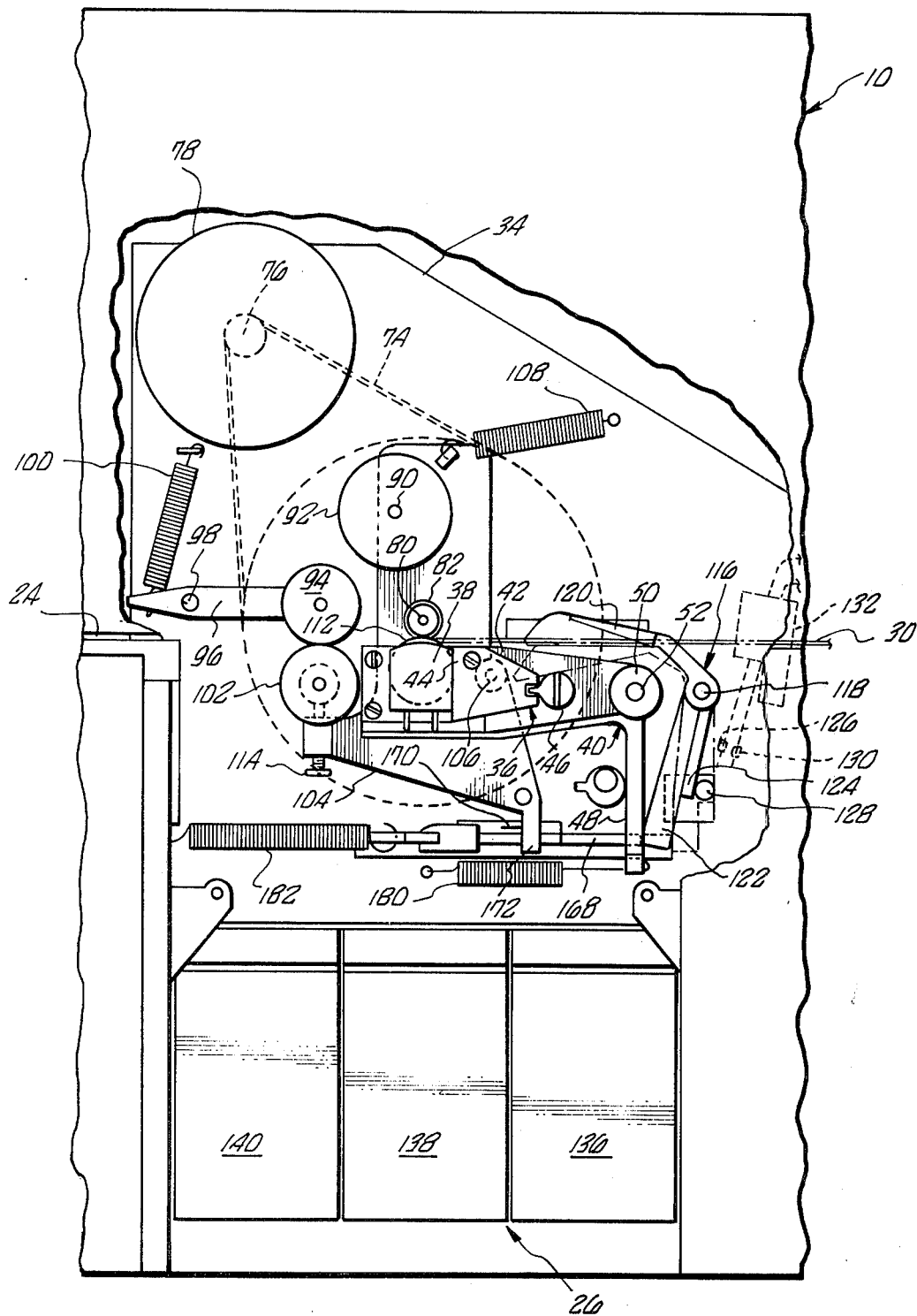
FIG. 4 is a partial plan view of the teaching device with a portion of the housing removed for clarity.
Figure 5:
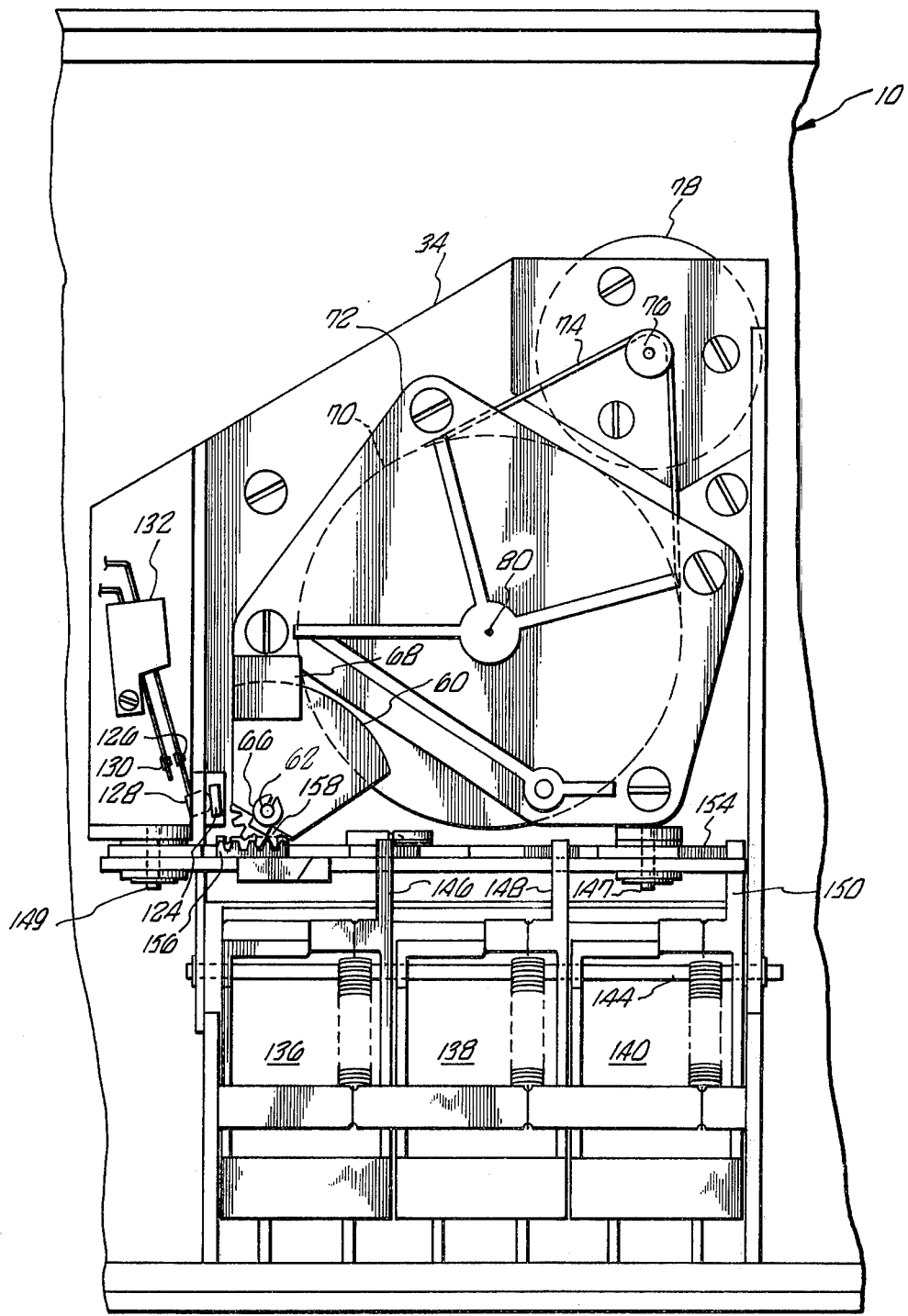
FIG. 5 is a partial bottom view of the teaching device with the housing removed for clarity.

A magnetic recording and reproducing head assembly, generally designated 36, is best seen in FIGS. 4 and 7. The head assembly 36 includes a magnetic recording and reproducing head 38. The head 38 is positioned to extend to the card path 24 to intercept the card 30 as can be seen in both FIG. 4 and FIG. 7. A bell crank 40 supports the head 38 on the chassis 34. One arm 42 of the bell crank 40 includes a broad surface for receiving the head 38. The head 38 is specifically fixed to an adjustment plate 44. The adjustment plate 44 is in turn affixed to the arm 42 of the bell crank 40. Adjustments to the positioning of the head 38 are thus easily made using the adjustment screw 46. The second arm 48 of the bell crank 40 extends at substantially right angles from the first arm 42 such that control over the pivotal location of the magnetic recording and reproduction head assembly 36 may be facilitated. The fulcrum of the bell crank 40 is at hub 50, a shaft 52 extends downwardly from the hub 50. The hub and the shaft 50 and 52 are fixed together such that the shaft 52 will not pivot relative to the hub or move longitudinally through the hub 50.

The shaft 52 extends downwardly from the hub 50 through a simple bearing 54 fixed to the chassis 34. The shaft 52 is able to both rotate and move longitudinally in the bearing 54. Actual pivotal movement of the head assembly 36 is illustrated in phantom in FIG. 6 while vertical translation of the head assembly 36 relative to the chassis 34 is seen in phantom in FIG. 7. Pivotal movement of the head assembly 36 away from the card path 24 prevents recording on or playback from the magnetic strip 32 when the card is being returned to the start position. Vertical translation of the head assembly 36 provides lateral movement of the head 38 across the card path to selectivey align with either of the two tracks on the magnetic strip 32. Below the bearing 54, a spring 56 is placed in compression around the shaft 52 by a ring clamp 58. This prevents the shaft 52 and head assembly 36 from moving upwardly out of the bearing 54. However sufficient translational movement is allowed for the shaft 52 to accommodate alignment of the head 38 with each track on the magnetic strip 32.

A track selection means is provided for moving the head assembly vertically in the unit, laterally relative to the card path 24. The track selection means includes a cam 60 pivotally mounted to the chassis 34 about a shaft 62. The shaft 62 is substantially parallel to the shaft 52 associated with the head assembly 36. A cam surface 64 defines first and second levels with a sloping transition portion therebetween as can be seen in FIG. 14. The shaft 52 associated with the head assembly 36 includes a hemispherical end which rides on the cam surface 64. As the cam rotates, the shaft 52 is raised and lowered to the first and second levels on the cam surface 64. The two levels correspond with the alignment of the head 38 with each of the tracks on the magnetic strip 32. The cam 60 is held on the shaft 62 by means of a ring clamp 66 and is further supported by a bracket 68 which is rigidly fixed relative to the chassis 34. The bracket 68 is positioned immediately below the shaft 52 associated with the head assembly 36 to counteract the bearing forces exerted on the cam 60. Thus, control and location of the cam in two positions will effect a selection of the track on a card 30.

Means are provided for moving the card 30 along the card path 24. The means for moving the card is comprised of a forward drive means and a return drive means. The forward drive means moves the card 30 along the card path 24 across the head assembly 36 from right to left. This is the forward direction for the card and the card will play normally or be recorded on as it moves. The return drive means quickly moves the card from left to right to bring the card 30 back into a starting position on the extreme right portion of the card path 24.

The forward drive means includes a large flywheel 70 rotatably mounted between the main body of the chassis 34 and a flywheel mounting bracket 72. The flywheel 70 includes a circular track (not shown) to receive a drive belt 74. The drive belt 74 is maintained in tension around the flywheel 70 and a drive pulley 76 associated with a motor 78. The motor 78 is thus coupled to drive the flywheel 70. Extending up through the body of the chassis 34 is a drive shaft 80 about which is fixed a forward drive capstan 82. The forward drive capstan 82 extends to a position adjacent to the card path 24 such that when the forward drive capstan 82 encounters a card 30, it will propel the card 30 forward through the card path 24 toward the left.

The return drive means is also driven from the flywheel 70. Located between the flywheel 70 and the chassis 34 on the drive shaft 80, there is located a second drive pulley 84. The second drive pulley 84 is fixed to rotate with the flywheel 70 and is coupled via a second drive belt 86 to a driven pulley 88. The driven pulley 88 then extends by fixed shaft 90 to a driven roller 92. The driven roller 92 may be selectively brought into contact with a return drive capstan 94 to effect the return of a card 30 to the starting position at the right of the card path 24. An arm 96 is pivotally mounted to the chassis 34 at pin 98. The return drive capstan 94 is rotatably mounted at one end of the arm 96 at a distance from the pin 98 such that the return drive capstan 94 may be forced toward or retracted from the card path 24. A spring 100 extendng in tension between the chassis 34 and the arm 96 biases the return drive capstan 94 toward the card path 24. Located across the card path 24 from the return drive capstan 94 is a pinch roller 102 which is generally in rolling contact with the return drive capstan 94.

The bias provided by the spring 100 forces the return drive capstan 94 against the pinch roller 102. This slightly compressive association between the return drive capstan 94 and the pinch roller 102 help guide the cards along the card path 24. Both the return drive capstan 94 and the pinch roller 102 rotate freely and thus normaly do not restrict the passage of a card 30. However, the driven roller 92 may be brought into rolling contact with the return drive capstan 94. As the driven roller 92 is connected via the flywheel 70 to the motor 78, the return drive capstan 94 is forced to rotate to move the cards 30 toward the right. To insure non-slip return of the cards by the return drive capstan 94, the driven roller 92 is positioned to cooperate with the spring 100 to further bias the return drive capstan 94 against the pinch roller 102. As a result, positive return of the cards 30 is achieved.

A selection plate 104 is pivotally mounted to the chassis 34 about an axis 106 as can best be seen in FIG. 6. The selection plate 104 is biased in a clockwise direction as seen from above by a spring 108 extending in tension between the selection plate 104 and the chassis 34. A shaft 110 extends upwardly from the selection plate 104 to rotatably mount a pinch roller 112. The pinch roller 112 is located across the card path 24 from the forward drive capstan 82. The pinch roller 112 is normally biased against the forward drive capstan 82 when the selection plate 104 is infuenced by the spring 108. In this way, the forward drive capstan 82 is capable of moving the cards 30 across the card path 24 in a forward direction toward the left. When the selection plate 104 is pivoted against the force of spring 108 in a counterclockwise direction, the pinch roller 112 moves away from the forward drive capstan 82 and necessarily away from the card path 24. With the selection plate 104 thus rotated, the forward drive means is incapable of propelling a card along the card path 24.

Also mounted on the selection plate 104, the driven pulley 88, fixed shaft 90 and driven roller 92 are moved into and out of engagement with the return drive capstan 94 as the selection plate 104 is pivoted. As the driven pulley 88 moves about the axis 106 which is proximate to the drive shaft 80, the second drive belt 86 is little affected by pivoting the selection plate 104. Thus, as the selection plate 104 is pivoted in a counterclockwise direction, the forward drive means ceases to drive the cards 30 while the driven roller 92 activates the return drive capstan 94 such that the return drive means becomes capable of returning cards to the starting position. Alternately, as the selection plate 104 is allowed to return to its normal position, the forward drive means again influences the cards 30 while the return drive means becomes disengaged from the driving motor 78. A set screw 114 adjusts the positioning of the selection plate 104 when it is solely influenced by spring 108.

A switch 116 is mounted on the chassis 34. Switch 116 provides the main power switch to the unit. The switch 116 is in the form of a bell crank having a fulcrum about axis 118 where it is pivotally mounted to the chassis 34, a first arm 120 which extends from the fulcrum toward and into the card path 24 and a second arm 122 by which the switch 116 may be actuated. The second arm 122 further includes a downwardly extending member 124 which approaches the end of a first contact 126. The contact 126 includes a bearing block 128 which contacts the downwardly extending member 124. A second contact 130 is positioned adjacent the contact 126. Contact support block 132 holds the contacts 126 and 130 in position such that unloaded they do not touch. However, when the switch 116 is pivoted in a counterclockwise direction viewed from above, the downwardly extending member 124 forces the bearing block 128 and in turn the contact 126 against the contact 130 to provide power to the unit. The power is only on to the unit when the contacts 126 and 130 are touching. As this touching occurs only when the switch 116 has been forced in a counterclockwise direction, the switch 116 controls the on-off condition of the teaching device.

First arm 120 of the switch 116 extends, in the relaxed position, across the card path 24. When a card 30 is inserted into the card path 24, the switch 116 is forced in a counterclockwise direction. Thus, introduction of a card 30 into the card path 24 operates to turn on the unit. The motor 78 is connected directly to the contacts. Consequently, once a card 30 is inserted into the card path 24, the means for moving the card along the card path 24 will operate to move the card until the switch 116 is no longer influenced by the card 30. Furthermore, it is only during this time that the sound recording and reproducing electronics are also on.

As discussed above, the selection plate 104 is normally in a position such that the forward drive capstan 82 and the pinch roller 112 are in contact and the driven roller 92 is separated from the return drive capstan 94. Thus, when a card is inserted into the card path 24, the switch 116 is forced to the on position and the card will be automatically drawn along the card path 24 by the forward drive capstan 82 past the head 38 until the trailing end of the card 30 passes the end of the first arm 120 of the switch 116. As the trailing edge of the card 30 passes the end of the first arm 120, power is cut off.

The card will continue for some distance due to the inertia of the flywheel 70 and forward drive capstan 82. Once the trailing edge of the card 30 has passed the forward drive capstan 82, or once the forward drive capstan 82 has stopped, the card will cease to move forward to the left.

As will be fully discussed below, when the selection plate 104 is forced to pivot counterclockwise as viewed from above, the second arm 122 of the switch 116 is also forced in a counterclockwise direction. With the selection plate 104 rotated counterclockwise, the means for moving the card 30 is in a reversed mode with the driven roller 92 contacting the return drive capstan 94. With the switch 116 also rotated in a counterclockwise direction, the contacts 126 and 130 are brought together to turn on the power, specifically to the motor 78.

Thus, when both the selection plate 104 and the switch 116 are rotated counterclockwise, the return drive is activated and the card 30 is forced to return to its starting position by the return drive capstan 94. As before, the card will continue for a short distance. However, the card has not been returned to the right side of the card path 24 where it again operates to hold the switch 116 in the counterclockwise position. Thus, the unit remains on until the card is removed or is again allowed to pass back along the card path 24 to relieve switch 116.

With the card returned to the right side of the card path 24, the selection plate 104 may be allowed to return under the influence of spring 100. This return allows the forward drive means to again take hold of the card 30 and drive it forward along card path 24. Thus, once inserted in the card path 24, a card will only come to rest after having passed to the left end of the card path 24. However, a card may be momentarily held in the starting position on the right of the card path 24 by retaining the selection plate 104 in its counterclockwise position.

Sound recording and reproducing means associated with the head assembly 36 is provided for recording on the magnetic strip 32 or reproducing that which has already been recorded thereon. This sound recording and reproducing electronics is of a conventional design and has been largely omitted for clarity of the invention. The recording and reproducing means naturally interfaces with the on-off contacts 126 and 130, the head 38, the microphone 12, the speaker 14, the volume control 16 and the two auxiliary jacks 20. Furthermore, the sound recording and reproducing means must either be in the recording mode or in the reproducing mode. Consequently, a selector switch means is provided for selecting from these modes. In the present embodiment, the selector switch means includes switch 134 and a second similar switch (not shown). The two switches are associated with the keyboard to select the proper mode.

Control of the teaching device is provided through manipulation of the keyboard 26. The keyboard 26 and the associated actuator plates provide full control of the present unit. There are three keys, an instructions play key 136, a recitations play key 138 and a record key 140. Depression of any one of the three keys will automatically actuate the return drive means to drive the card 30 along the card path 24 to the starting position. Continued depression of any of the three keys will then retain the card in this position. The instructions play key 136 also acts to place the head assembly 36 in alignment with the upper track of the magnetic strip 32. Furthermore, the switch means will be in the reproducing position. When the instructions play key 136 is released, the teaching device will play the instructions located on the upper track of the magnetic strip 32.

The recitations play key 138 also, when depressed, returns the card 30 to the right hand start position and the switch means is in the reproducing mode position. Unlike the instructions play key 136, depression of the recitations play key 138 positions the head assembly 36 in alignment with the lower track of the magnetic strip 32. Thus, when the recitations play key 138 is depressed and released, the teaching device will play the student's previous recitation on the lower track of the magnetic strip 32.

The record key 140, when depressed, returns the card to the starting position in the card path 24, causes the switch means to assume the recording mode position and positions the head assembly 36 on the lower track. The switch means includes the second switch (not shown) under both play keys 136 and 138 to actuate the play mode. When the record key 140 is released, the operator may recite into the microphone 12, the recitation being recorded on the lower track of the magnetic strip 32.

The record key 140 provides a second function if pushed up and toward the unit rather than depressed. When the record key 140 is pushed up and in, switch 134, aligned with the record key 140, assumes the recording mode position and the head assembly 36 becomes aligned with the upper track on the magnetic strip 32. This allows the instructions track to be changed by the instructor. This upward and inward operation of the record key 140 is designed to be unobvious to the student such that he cannot erase the instructions track. To further frustrate the student in such an endeavor, a lock switch as can be seen in FIG. 12 may be employed to interfere with the record key 140. To further prevent the re-recording or erasure of the instructions, the return drive means is not actuated by forcing the record key 140 to the up position. Thus, to record further instructions, it is necessary to remove the card from the the card path 24 and re-insert same at the starting position on the right end of the card path 24.

To accomplish the above functions, the keys 136, 138 and 140 are pivotally mounted to the chassis 34 on a rod 144. Furthermore, actuator arms 146, 148 and 150 extend inwardly from the keys 136, 138 and 140 respectively. These actuator arms engage two actuator plates 152 and 154 which are slidably positioned on the chassis 34 by pins 147 and 149 which extend from the chassis 34 to engage slots in the actuator plates 152 and 154.

The forwardmost actuator plate 152 determines the position of the head assembly 36. Located on the back wall of the actuator plate 152 is a short gear rack 156. The gear rack 156 is functionally associated with the cam 60 which contains a portion 158 of a pinion gear. This device is best illustrated in FIG. 13. Thus, when the actuator plate 152 moves to the right or left relative to the chassis 34, the cam 60 assumes one of two positions. As fully discussed above, the positioning of the cam directly results in the alignment of the head assembly 36 with either the upper or the lower tracks of the magnetic strip 32. Thus, as can be seen in FIGS. 9 and 10, when either the recitations play key 138 or the record key 140 is depessed, the actuator plate 152 will move to the left and lower the head 38. In FIG. 9, actuator arm 148 has acted against actuator plate surface 160 to force the actuator plate 152 to the left. In FIG. 10, actuator arm 150 has acted upon actuator plate surface 162 to force the actuator plate 152 to the left. As can be seen in FIG. 8, the actuator arm 148 has acted upon actuator plate surface 164 to move the actuator plate 152 to the right, thereby raising the head assembly 136. In FIG. 11, the actuator arm 150 was forced down to act upon the actuator plate surface 166 to also force the actuator plate 152 toward the right and thereby raise the head assembly 36.

The second actuator plate 154 is positioned immediately behind actuator plate 152 to control the means for moving the card. The actuator plate 154 includes an upwardly extending arm 168 which encounters the second arm 48 of the bell crank 40. As the actuator plate 154 moves to the right, the bell crank 40 is rotated counterclockwise away from the forward drive capstan 82. In this way, the card may return to the starting position without either playing or recording by the head 38. The upwardly extending arm 168 also engaged the end of the second arm 122 of the switch 116. Again, as the upwardly extending arm 168 moves to the right, the switch 116 is rotated counterclockwise to connect the source of power across contacts 126 and 130. The actuator plate 154 also operates to pivot the selection plate 104 counterclockwise by means of a spring 170 fixed at one end to the actuator plate 154 and extending to an arm 172 located on the selection plate 104. Thus, when the actuator plate 154 moves to the right, the contacts 126 and 130 are brought together, the head assembly 136 is retracted from the forward drive capstan 82 and the selection plate 104 disables the forward drive means and enables the return drive means. As a result, the return drive means is powered to return the card 30 to its starting position on the right side of the card path 24.

All three keys 136, 138 and 140 are designed to force the actuator plate 154 to the right when depressed. The actuator plate 154 is shown in its relaxed position in phantom in FIG. 8. Otherwise, it is shown in its return position in FIGS. 8, 9 and 10. To force the actuator plate 154 to the return position, actuator arms 146, 148 and 150 operate on actuator plate surfaces 174, 176 and 178 respectively. It can be seen from FIG. 11 that when the record key 140 is forced upwardly and inwardly, the actuator plate 154 is not forced to the right. The actuator plate 154 and the head assembly 36 are spring loaded to return to the play position by spring 180. Spring 180 extends from the second arm 48 to the chassis 34 where it biases both the actuator plate 154 and the second arm 48 to the left.

A second spring 182 is directly attached to the actuator plate 154 and at the other end to the chassis 34 to further urge the actuator plate 154 to the left.

To play the teaching device, a student depresses the instructions play key 136. The student then inserts the card 30 in the card path 24 at the starting position on the extreme right thereof. Once the card has been forced along the card path 24 until it engages the switch 116 and also the forward drive capstan 82, it will continue to the extreme left of the card path 24. As it passes the head 38, the instructor's comments will be played the instructions play key 136 may be repeatedly depressed until the student has the instructions firmly in mind. With the card always returning to the left, the student then depresses the record key 140 which returns the card 30 to the starting position on the right. When the record key 140 is released, the student speaks into the microphone as the card 30 passes to the left side. The student may then depress the recitations play key 138 to return the card to the right, starting position. The key may then be released and the student's recitation played back for him to listen to his own work. The several steps may be repeated as many times as necessary for the student to learn whatever has been placed on the card. Succeeding cards may then be inserted for further learning.

At some time, the instructor may wish to make up his own cards or place new exercises on old cards. In such an instance, the lock switch 142 is displaced from its interfering position with the record key 140. The record key 140 is then forced upwardly and inwardly as allowed by the slot 184 unique to the record key 140. The record key 140 may then be released and one or many cards may be inserted into the card path 24 at the right. As the card passes across the head 38, new exercises may be dictated on to the upper track of the magnetic strip 32. The printed indicia on the card may also be changed if the new exercise does not involve the same material.

Thus, a teaching device employing magnetic cards is disclosed which provides exceptionally simple controls requiring a minimum of aptitude to run the mechanism.

While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A teaching device employing cards, each card including printed indicia and a magnetic strip thereon comprising
   a chassis;
   a card path extending across said chassis;
   a magnetic recording and reproducing head assembly mounted on said chassis and selectively extending to said card path;
   sound recording and reproducing means associated with said head assembly for recording on the magnetic strip and for reproducing that which has been recorded on the magnetic strip, including selector switch means for selecting from recording and reproducing modes;
   means for moving the card along said card path for both advancing and retracting the card past said head assembly, said means for moving the card being activated to drive the card forward across said head assembly by insertion of the card in said card path;
   track selection means for actuating said head assembly to select a track on the magnetic strip;
   main control means for controlling said track selection means and said means for moving the card in said selector switch means, said main control means including first control means for actuating said means for moving the card to return the card to a starting position in said card path, for actuating said track selection means to select a first track on the magnetic strip and for actuating said selector switch means to select the reproducing mode, second control means for actuating said means for moving the card to return the card to a starting position in said card path, for actuating said track selection means to select a second track on the magnetic strip and for actuating said selector switch means to select the reproducing mode, and third control means for actuating said means for moving the card to return the card to a starting position in said card path, for actuating said track selection means to select the second track on the magnetic strip and for actuating said selector switch means to select the recording mode.

2. The teaching device of claim 1 wherein said magnetic recording and reproducing head assembly is pivotally mounted on said chassis, said head assembly being capable of moving laterally relative to said card path to align with selected tracks on the magnetic strip; and
   said trick selection means moves said head assembly laterally relative to said card path.

3. The teaching device of claim 2 wherein said head assembly includes
   a magnetic head;
   a support member, said magnetic head being supported on said support member;
   a shaft pivotally and slidably mounted to said chassis, said support member being fixed to said shaft;
   said track selection means including a cam pivotally mounted to said chassis at one end of said shaft such that said end of said shaft rides on said cam, said cam including a cam surface to selectively position said head assembly to upper and lower positions for alignment with two tracks on the magnetic strip.

4. The teaching device of claim 1 wherein said means for moving the card includes forward drive means extending to said card path for moving the card along said card path past said head assembly in a first direction;

return drive means capable of extending to said card path for moving the card along said card path in the opposite direction to said first direction, and return drive means overdriving said forward drive means when said return drive means is activated.

5. The teaching device of claim 4 wherein said forward drive means includes
   a flywheel;
   a forward drive capstan fixed to rotate with said flywheel and extending to one side of said card path for contacting and moving a card along said card path;
   a pinch roller selectively movable into and out of rolling engagement with said forward drive capstan to hold a card positioned in said card path against said forward drive capstan.

6. The teaching device of claim 5 wherein said pinch roller selectively retracted from said forward drive capstan by each of said first, second and third control means.

7. The teaching device of claim 4 wherein said return drive means includes
   a return drive capstan extending to one side of said card path for rolling contact with a card positioned in said card path;
   a pinch roller in rolling relationship with said return drive capstan across said card path;
   a driven roller selectively movable on said chassis for selective engagement of said return drive capstan.

8. The teaching device of claim 7 wherein said return drive means further includes an arm pivotally mounted on said chassis and a spring means biasing said arm toward said pinch roller, said return drive capstan being rotatably mounted on said arm, said driven roller being selectively movable into rolling contact with said return drive capstan such that return drive capstan is further biased against said pinch roller.

9. The teaching device of claim 7 wherein said driven roller is selectively movable into rolling contact with said capstan by actuating each of said first, second and third control means.

10. The teaching device of claim 4 wherein said forward drive means includes a forward drive capstan, a flywheel rotatably mounted on said chassis, said forward drive capstan being fixed to rotate with said flywheel and extending to one side of said card path, and a pinch roller capable of being selectively placed in compression against said forward drive capstan across said card path;
   said return drive means including a return drive capstan extending to one side of said card path, a second pinch roller capable of rolling contact with said return drive capstan and positioned across said card path from return drive capstan and a driven roller capable of being selectively moved into rolling contact with said capstan;
   the teaching device further comprising a selection plate pivotally mounted to said chassis, said pinch roller and said driven roller being rotatably mounted to said selection plate at a distance from the pivotal axis of said selection plate such that said pinch roller will disengage said forward drive capstan and said driven roller will engage said return drive capstan when said selection plate is pivoted in a first direction, said selection plate being selectively pivoted in said first direction by each of said first, second and third control means.

11. The teaching device of claim 2 wherein said head assembly is pivotally mounted to retract from said card path during return of a card to a starting position in said card path.

12. The teaching device of claim 11 wherein said head assembly is pivotally retracted from said card path by actuation of each of said first, second and third control means.

13. The teaching device of claim 1 wherein said sound recording and reproducing means includes a microphone and a speaker.

14. The teaching device of claim 1 wherein said third control means may be selectively actuated for actuation of said track selection means to position said head assembly in alignment with the first track on the magnetic strip and for actuating said selector switch means to select the recording mode.

15. The teaching device of claim 14 wherein said third control means includes a lock for preventing actuation for selectively positioning said head assembly in alignment with the first track on the magnetic strip.

16. A teaching device employing cards, each card including printed indicia and a magnetic strip thereon, comprising
   a chassis;
   a card path extending across said chassis;
   a magnetic recording and reproducing head assembly pivotaly mounted on said chassis and selectively extending to said card path, said head assembly being capable of moving laterally relative to said card to align with selected tracks on the magnetic strips;
   sound recording and reproducing means associated with said head assembly for recording on the magnetic strip and for reproducing that which has been recorded on the magnetic strip, including selector switch means for selecting from recording and reproducing modes;
   forward drive means including a flywheel, a forward drive capstan fixed to rotate with said flywheel and extending to one side of said card path for contacting and moving a card along said card path, a first pinch roller selectively movable into and out of rolling engagement with said forward drive capstan to hold a card position in said card path against said forward drive capstan;
   a return drive means including a return drive capstan extendng to one side of said card path for rolling contact with a card positioned in said card path, a second pinch roller in rolling relationship with said return drive capstan across said card path, a driven roller selectively movable on said chassis for selective engagement of said return drive capstan;
   a selection plate pivotally mounted to said chassis, said first pinch roller and said driven roller being rotatably mounted to said selection plate at a distance from the pivotal axis of said selection plate such that said first pinch roller will disengage said forward drive capstan and said driven roller will engage said return drive capstan when said selection plate is pivoted in a first direction;
   track selection means for moving said head assembly laterally relative to said card path;
   first control means for selectively pivoting said selection plate in the first direction to return the card to a starting position in said card path, for actuating said track selection means to position said head assembly in alignment with a first track on the magnetic strip and for actuating said selector switch means to select a reproducing mode;

second control means for selectively pivoting said selection plate in the first direction to return the card to a starting position in said card path, for actuating said track selection means to position said head assembly in alignment with a second track on the magnetic strip and for actuating said selector switch means to select the reproducing mode;

third control means for selectively pivoting said selection plate in the first direction to return the card to a starting position in said card path, for actuating said track selection means to position said assembly in alignment with the second track on the magnetic strip and for actuating said selector switch means to select the recording mode, said forward drive means being activated to drive the card forward across said head assembly by insertion of the card in said card path.

17. A teaching device employing cards, each card including printed indicia and a magnetic strip thereon comprising
a chassis;
a card path extending across said chassis;
a magnetic recording and reproducing head assembly mounted on said chassis and selectively extending to said card path;
sound recording and reproducing means associated with said head assembly for recording on the magnetic strip and for reproducing that which has been recorded on the magnetic strip, including selector switch means for selecting from recording and reproducing modes;

means for moving the card along said card path for both advancing and retracting the card past said head assembly, said means for moving the card being activated to drive the card forward across said head assembly by insertion of the card in said card path;

track selection means for actuating said head assembly to select a track on the magnetic strip;

main control means for controlling said track selection means and said means for moving the card in said selector switch means, said main control means including first control means for actuating said means for moving the card to return the card to a starting position in said card path, for actuating said track selection means to select a first track on the magnetic strip and for actuating said selector switch means to select the reproducing mode, second control means for actuating said means for moving the card to return the card to a starting position in said card path, for actuating said track selection means to select a second track on the magnetic strip and for actuating said selector switch means to select the reproducing mode, and third control means for actuating said track selection means to select the second track on the magnetic strip and for actuating said selector switch means to select the recording mode.

* * * * *

UNITED STATES PATENT AND TRADEMARK OFFICE
CERTIFICATE OF CORRECTION

PATENT NO. : 4,031,634
DATED : June 28, 1977
INVENTOR(S) : Edwin Stastny, Keith Rauch, Ronald Young It is certified that error appears in the above-identified patent and that said Letters Patent are hereby corrected as shown below:

At column 10, line 51, after "said", delete "trick" and insert therefor --track--.

At column 11, line 6, after "said first direction", delete "and" and insert therefor --said--.

Signed and Sealed this

Fourth Day of October 1977

[SEAL]

Attest:

RUTH C. MASON
Attesting Officer

LUTRELLE F. PARKER
Acting Commissioner of Patents and Trademarks